United States Patent [19]

Holbert, Jr.

[11] Patent Number: 4,880,257

[45] Date of Patent: Nov. 14, 1989

[54] PRESSURE COMPENSATION MULTI TUBULAR SAFETY JOINT

[75] Inventor: Marvin L. Holbert, Jr., Houston, Tex.

[73] Assignee: Max Bassett, Houston, Tex.

[21] Appl. No.: 478,054

[22] Filed: Mar. 23, 1983

[51] Int. Cl.[4] .............................................. F16L 35/00
[52] U.S. Cl. .......................................... 285/2; 285/29; 285/306; 285/900; 285/920
[58] Field of Search ..................... 285/2, 3, 4, 26, 29, 285/306, 900, 18, 920, 137.1

[56] References Cited

U.S. PATENT DOCUMENTS

| | | | |
|---|---|---|---|
| 2,649,742 | 8/1953 | Armstrong | 285/137.1 X |
| 4,059,288 | 11/1977 | Mohn | 285/2 |
| 4,348,039 | 9/1982 | Miller | 285/900 |
| 4,361,165 | 11/1982 | Flory | 285/2 X |
| 4,501,287 | 2/1985 | Thomson | 285/3 X |
| 4,688,827 | 8/1987 | Bassett | 265/900 |

FOREIGN PATENT DOCUMENTS

| | | | |
|---|---|---|---|
| 6704190 | 9/1967 | Netherlands | 285/137.1 |
| 174803 | 2/1922 | United Kingdom | 285/137.1 |

Primary Examiner—Dave W. Arola
Attorney, Agent, or Firm—David M. Ostfeld

[57] ABSTRACT

A pressure compensation multi tubular safety joint for use with tubular sections is disclosed wherein a weak link is included that causes the joint to separate under axial load before permanent damage is done to the tubular sections but which compensates for pressure changes in the tubular sections. The joint includes two members, one of which has means for permitting the separation under conditions where the load is only partially axial. The joint further includes means for pre-stressing the joint to relieve the load on the weak link while the joint is lowered into position and further means for relieving the pre-stress through the flowing fluid in the sections.

14 Claims, 5 Drawing Sheets

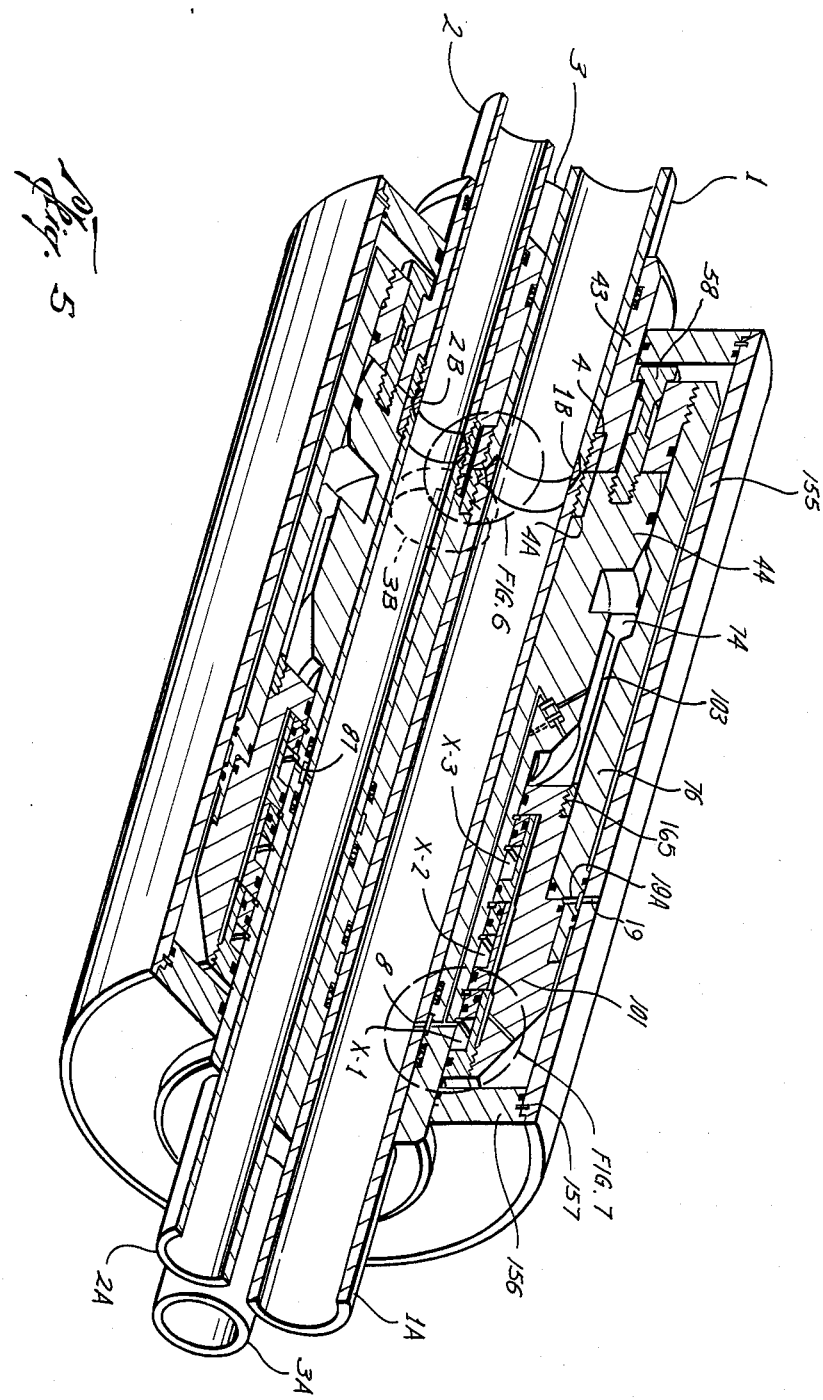

PRESSURE COMPENSATION MULTI TUBULAR SAFETY JOINT

BACKGROUND OF THE INVENTION

1. Field of the Invention

The present invention relates to safety joints used in pressure containing tubular system, such as pipelines, flow-lines, offshore drilling risers and the like where it is desirable to have a pre-selected "weak link" so that if an unexpected, substantial axial load is applied to the tubular system, such as through inadvertent hooking of a drag line or the like, the tubular system will separate at a pre-selected point to minimize damage. Particularly, the present invention relates to multiple tubes having a shared, pre-selected "weak link".

2. Description of the Prior Art

In the petroleum and related industries, it is frequently desirable to drill and complete a multiplicity of individual wells in an underwater area too large or, for other reasons, too difficult to be accomplished from a single structure or platform.

The production from these individual underwater wells (referred to as satelite wells) is frequently conducted to a central gathering point located on a platform or shore installation via pipeline or multiple pipe lines.

Each satelite well may produce from a multiplicity of production zones, and each of the production zones is generally produced separately and its production kept isolated one from another due to pressure differences, and other dissimilarities. This isolation of dissimiliar production fluids must generally be continued to and beyond the central gathering point.

In addition to one flow line for each production zone in a particular satelite well, an additional line is required if the operator wishes to service these wells remotely by employing a technique known as T.F.L. (through-flow-line).

This technique is a means by which various service tools are pumped through one of the flow lines from the central gathering point to and down into an individual tubing string within a given satelite well.

The fluids displaced by this pumping operation are returned to the central gathering point through an additional flow line. This return line is subsequently employed to reverse the pumping flow and return the service tools to the central gathering point.

As an example: a dual completion (a well producing from two (2) zones) requiring T.F.L. services would require one flow line for each of the two production zones plus an additional flow line to accomodate T.F.L. service; or a total of three (3) flow lines. These three flow lines would be continuous from a given satelite well to the central gathering points.

For reasons of economics, ease of installation, underwater identification and strength considerations, operators frequently fasten or bundle flow lines into a single unit. This "bundled" unit proceeds from a particular satelite well to its destination at a central gathering point.

Because satelite well heads and central gathering points represent points of relative fixity, it is desirable to have the relatively flexible flow line bundle automatically disengage itself from the fixed points should the flow line bundle experience severe physical loads; e.g., dragging boat anchors shifts in the ocean bottom or substantial movement occasioned by ocean currents, storms and the like.

In normal application without a weak link, if such a branch line were hooked and pulled excessively, the trunk line would likely be buckled or damaged in similar manner. By having a separate weak link placed in the branch line next to the trunk line, the branch line would simply break away without damage to the trunk line of any substantial amount.

Another situation where it might be desirable to have a weak point in an underwater pipeline would be at the bottom of the riser which is fastened to an offshore production platform. Occasionally, a pipeline will be pulled by an anchor being hooked onto it or by loads exerted by storm conditions. If the pipeline connected to the bottom of the riser is not protected by a weak joint, then the riser pipe might actually be pulled away from the platform, causing damage to the riser in the form of a buckle or rupture.

For examples of prior art attempts to provide weak links in pipeline systems having a single tubing member, see U.S. Pat. No. 4,059,288, issued Nov. 22, 1977, to Harvey O. Mohr, entitled "Pressure Balanced Safety Pipeline Connector"; U.S. Pat. No. 4,348,039, issued Sept. 7, 1982, to Jack E. Miller, entitled "Release Coupling"; the brochure of Big-Inch Marine Systems, Inc., entitled "Big-Inch Marine Systems, Inc., Operating Of The Load Limiting Connector"; and the brochure of Cameron Iron Works, Inc., entitled "Breakaway Flowline Coupling". The Cameron and Big-Inch prior art devices, to the knowledge of the inventor, require the collet to bear both the physical and the hydraulic load. Mohr doesn't disclose a collet.

Accordingly, it is an object of the present invention to provide a multiple tube safety joint where the tubes have different flowing pressures.

It is a further object of the present invention to use pipeline pressure for relieving pre-load used for lowering a multiple tube pipeline onto the ocean floor.

It is a further object of the present invention to relieve the multiple tube connector from bearing physical load and have it bear only hydraulic load.

It is a further object of the present invention to provide a pressure compensated multiple safety joint that permits separation of the collet without substantial load on the collet in the event the tubular system is subjected to loads in excess of those deemed operational but less than loads which would overstress or damage the tubular or adjacent system. In this manner, the safety joint protects adjacent equipment, physically attached to the tubular system, such as valves, larger pipelines, wellheads, blowout preventer stacks, pressure vessels and the like from being damaged under physical load.

It is also an object of the present invention to provide a hydromechanical lock-out feature for preloading the mechanical tension on a multiple tube safety joint, with remote disengagement.

Therefore, it should be recognized that a connector capable of disengaging at a pre-detemined load to be installed at one or both ends of the flowline bundle would be desirable.

It might further be appreciated that connectors commonly employed by the industry such as flanges, clamp type or threaded connections are subject to variations in conduit pressure loads and therefore are unpredictable in tensile strength at any given time. These standard type connectors (flanged, clamp) are subject to additional forces when submerged in water, rendering the establishment of a predictable separation load in the prior art difficult within a reasonably acceptable range under usual conditions.

SUMMARY OF THE PRESENT INVENTION

The safety joint of the present invention is a safety joint for multiple conduits, such as three conduits (pipelines or flow lines), connected by and communicating through a common connector, wherein the conduits may be contained mechanically in a common connector while maintaining their individual continuity with respect to size, pressure, and product content.

The safety joint of the present invention is a simple, dependable connector designed for use in various pressurized tubular system functions wherein the axial loads generated by internal line pressure of multiple lines are offset partially or completely through the use of counteracting or compensating components or pistons within the connector. The counteracting components act as an adjustment of the axial pressure acting on the primary seal of the joint through pressure of the line fluids acting on the compensating components.

Each of the multiple containing conduits may be individually monitored with respect to individual contained pressure. This individual pressure is conducted to a specific piston/cylinder arrangement, so arranged as to exert a counteractive force to balance or partially balance the separation force which the primary seal in that particular conduit exerts. Each succeeding conduit is in turn provided with a similar such counteracting piston/cylinder arrangement. The sum of the various counteracting forces exerted by the multiple piston/cylinder arrangements are thence transmitted into a common mandrel. The common mandrel in turn transmits the sum of these counteracting forces to an interface with a second mandrel where the sums of the opposing forces are resolved, resulting in a balanced or partially balanced condition with respect to conduit pressure generated loads. Compressive forces exerted by hydrostatic pressure (experienced in under-water installations) against exterior surface interfaces and seals are balanced, or partially balanced, by other seals with the pressure being transmitted to the piston/cylinder arrangement.

The safety joint of the present invention is installed through the use of a surface actuated, remotely releasable, pre-load on the safety joint while it is being lowered from the surface thereby reducing or eliminating accidental pre-separation of the connector due to unexpected loads during laying operations. The pre-load is released through the use of fluids flowing in one or more tubes of the tubular system without expulsion of fluid to the surrounding water. The remote release is accomplished through a unique, one-way spool valve. In addition, the safety joint may be provided with manually actuated lock-out screws.

Bolting is applied to hold the system together. Accordingly, the bolting is subjected only to the stresses applied when the flanges are initially assembled. The bolting is prepared through the use of diameter reduction, or other suitable mechanism, to fail tensionally at any pre-determined value, regardless of either internal line pressure or an external pressure occasioned by the environment. Accordingly, when an unexpected physical load is applied to the line, such as the result of severe wave action, currents, illuvial movement, boat anchors or the like, the load, upon reaching a pre-selected magnitude set by the bolt diminished diameters, will cause the bolting to fail tensionally allowing one flange to move away from its mating flange. This separates the connection.

Further, the safety joint is enclosed to prevent corrosion from outside atmospheric intrusion and is also compensated for environmental pressure.

In addition, one side of the connector is adapted for lateral as well as longitudinal movement to permit compensation for forces which are not totally axial in nature.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 5 is a view, partially in cross-section and partially in perspective of the safety joint of the preferred embodiment of the present invention;

DESCRIPTION OF THE PREFERRED EMBODIMENT

Figure 3:
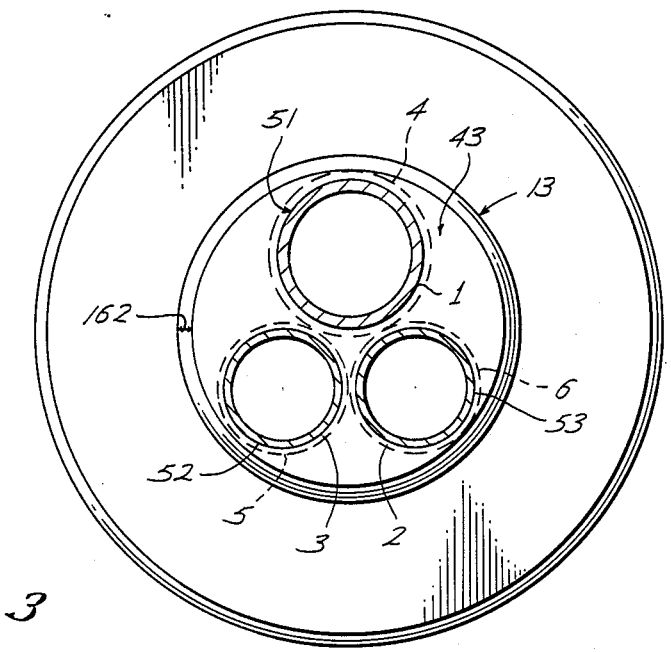
FIG. 3 is a prospective and cross-sectional view of the safety joint of the preferred embodiment of the present invention taken along section lines 3—3 of FIG. 1.

The safety joint of the present invention is generally designated by the numeral 200 and is shown around mandrels 1, 2, and 3. See FIGS. 1 and 3.

APPARATUS DESCRIPTION

Figure 1:
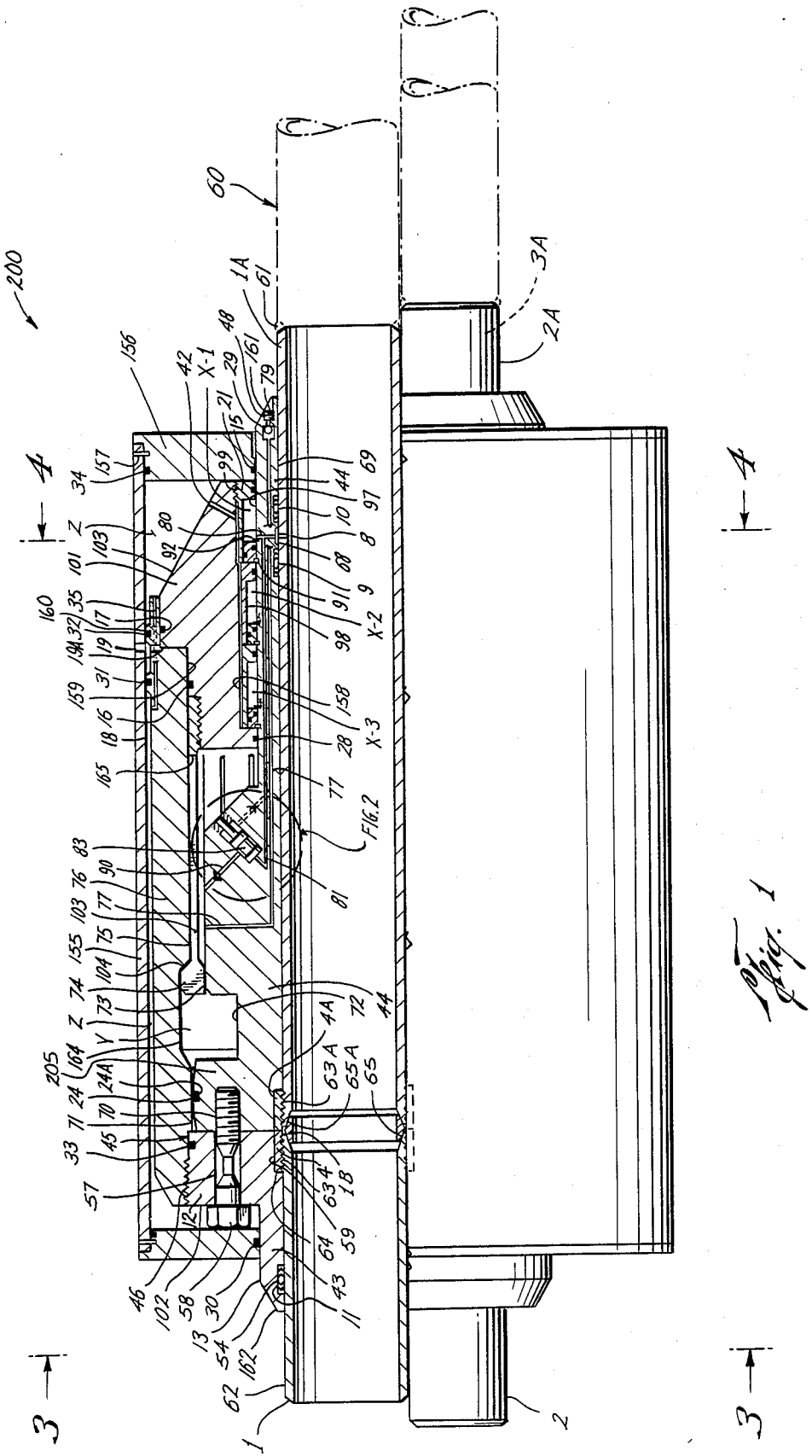
FIG. 1 is a side vide of the safety joint of the present invention, shown partially in cross-section.

Referring to FIGS. 1 and flange member 43 is provided with concentric small diameter sealing exterior surface 13, large diameter exterior sealing surface 45 and large diameter threaded portion 46 therebetween forming shoulder 102. Additionally flange member 43 is provided with three thru-bores 51 (FIGS. 1 and 3), 52 (FIG. 3), and 53 (FIG. 3) each thru-bore having a diameter sized respectively to receive mandrels 1, 2 and 3 therein. Thru-bores 51, 52 and 53 are each provided with a circumferentially positioned seal gland 54. See also FIGS. 5 and 8. Recesses 11 are provided to receive a seal element therein and are concentrically positioned about each thru-bore 51, 52 and 53. Each thru-bore 51, 52 and 53 is also provided with a counter bore recess 59 to slidably receive restraining sleeves 4, 5 and 6, respectively.

Flange member 43 is further provided with a multiplicity of bores 57 to slidably receive fasteners 58 therein.

For illustration, conduit mandrel 1 is typical of all of three mandrels. Unless otherwise stated, the description for it shall apply to all mandrels 1, 2 and 3.

Mandrel 1 is a tubular member having outer surface 62 and inner and outer diameters substantially identical to pipe 60 shown weldably joined to mandrel 1A at weld joint 61. Welding adjoining mandrel 1 and the adjacent pipe is generally considered preferable; however, the use of threads, clamps or flanges is not intended to be excluded.

The inner diameter of thru-bore 51 and the outer diameter of surface 62 are prepared so as to approach as nearly as practicable to each other thereby presenting the least annular clearance possible for the successful effect of seal element of recess 11. The clearance is to permit the slidable installation of mandrel 1 into thru-bore 51.

The inner end interior lower extremity of mandrel 1 is provided with threaded portion 63. Threaded position 63 should preferably not diametrically exceed the outer diameter of surface 62. Thread 63 should be sized to threadably receive matching thread provided in restraining sleeve 4.

Mandrel 1 also includes an interior frusto conical seal surface 65 (FIG. 1) to sealably receive double frusto conical primary seal 1B. After mandrel 1 has been joined to the adjacent pipe weld, mandrel 1 may slidably be inserted into thru-bore 51 and primary seal 1B, and restraining sleeve 4 may be threadably attached. Assembly of mandrel 1 and sleeve 4 is thereby restrained from leftward (as seen in FIG. 1) movement by abutting shoulder 64 formed by recess 59. The other mandrels 2 and 3 are similarly assembled.

Double frusto conical primary seal 1B is also sealably received on its right hand side (as seen by facing FIG. 1) by similarly prepared internal frusto conical seal surface 65A located within the left hand (as seen by facing FIG. 1) or interior extremity of mandrel 1A.

Mandrel 1A is adapted on its interior left most (as seen by facing FIG. 1) end to receive a restraining sleeve 4A. Mandrel 1A further includes an internal frusto conical seal surface 65A.

Figure 6:
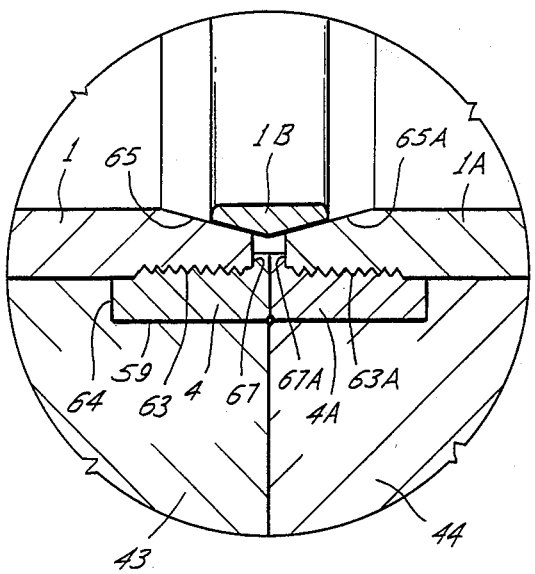
FIG. 6 is a cross-sectional view of a portion of the seal detail of the safety joint of the preferred embodiment of the present invention shown in FIG. 1.

Threads 63 are formed on restraining sleeve 4 such that internal shoulder 67 (FIG. 6) is formed at the internal right hand (as seen by facing FIG. 1) or FIG. 6 interior extremity of sleeve 4 whose internal diameter shall be less than thread 63, but greater than the major diameter of double frusto conical primary seal 1B. Restraining sleeve 4A would be formed with a mirror image interior shoulder portion 67A. (FIG. 6). The proper assembly of mandrels 1 and 1A with properly installed restraining sleeves 4, 4A will produce a double internal frusto conical profile of such suitable opposing pitch diameter as to double sealably receive double frusto conical primary seal 1B.

Mandrel 1A is adapted on its exterior or rightmost (as seen by facing FIG. 1) end to be jointed to pipe 60 at weld joint 61.

The other mandrels 2A, 3A are similarly provided and the description of mandrel 1A is applicable to descriptions for mandrels 2A, 3A.

Mandrel 1A is additionally provided with a side port 8. Side port 8 is positioned longitudinally in mandrel 1A so as to communicate with a corresponding groove 68 located mid-way between seal elements 9, 10 located in the side wall of the thru-bore 69 in flange member 44.

Flange member 44 is provided with thru-bores, such as bore 69 shown in FIG. 1, consistent in quantity, size and axial alignment as thru-bores 51, 52 and 53 provided in flange member 43.

Flange member 44 is prepared on its leftmost (as seen in FIG. 1) end with a flange portion of member 205 in which are disposed axially bores 70 adapted to threadably receive the interior fasteners 58 therein.

Threaded bores 70 match, in quantity, spacing and radial disposition, bores 57 located in flange 43 of the flange member 12 which are also adapted to receive fastener 58. Threaded bores 70 further include threads adapted to receive the threads of the interior end of fasteners 58.

The outer diameter surface of flange 44 has a seal groove 24 formed therein with a seal 24A located therein. The outer diameter surface of flange 44 is a radiused surface 71. Radiused surface 71 is generated concentrically about a point located at a distance equal to about one-half the thickness of flange 44, to the right of the leftmost end (as seen by facing FIG. 1) of flange member 44 on the axial center line of flange 44.

A recessed diameter portion 72 of flange 44 is located adjacently to the right (as seen by facing FIG. 1) of flange 205. Recessed diameter portion 72 shall be sufficiently diametrically less than upset diameter portion 73 located to the right of it (as seen by facing FIG. 1) to provide sufficient clearance for the outer diameter surface of deflecting collet dogs 74 to pass through minimum bore 75 located in housing 76.

Flange member 44 shall further be provided with a passageway 77 at the right hand end (as seen by facing FIG. 1) of upset diameter portion 73 of flange member 44. Passageway 77 is provided with a threaded end bore 48 to receive check valve 29 mounted in plug 79. Passageway 77 is also open to the outer diameter surface portion of upset diameter portion 73.

Passageway 77 provides the means for pre-pressuring pressure chamber Y described infra.

Cross port 80 is also formed in flange member 44 and provides communication for pressurized fluid contained in mandrel 1A to pressure chamber X-1, described infra. Similar cross ports are formed for mandrels 2A, 3A and chamber X-2, X-3, described infra.

Figure 2:
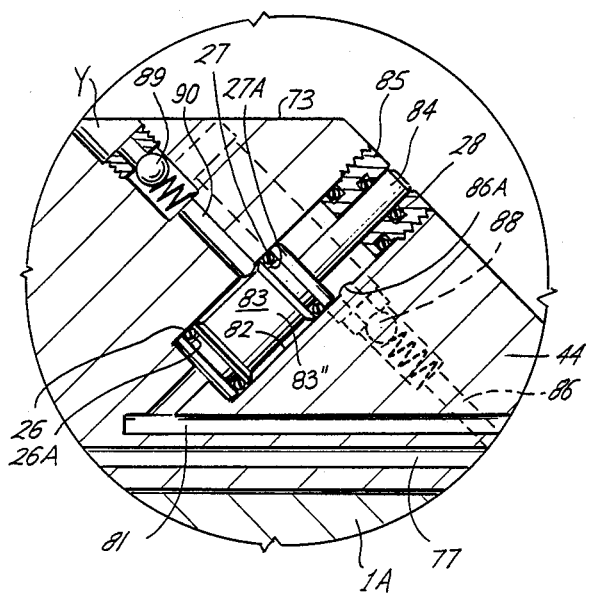
FIG. 2 is a cross-sectional view of the valve detail, of the safety joint of the preferred embodiment of the present invention shown in FIG. 1.

Cross port 80 is intersected by one end of passageway 81. As shown in FIG. 2, passageway 81 terminates at its other end with the intersection of cylinder bore 82 formed in upset diameter portion 73 of flange member 44.

Figure 4:
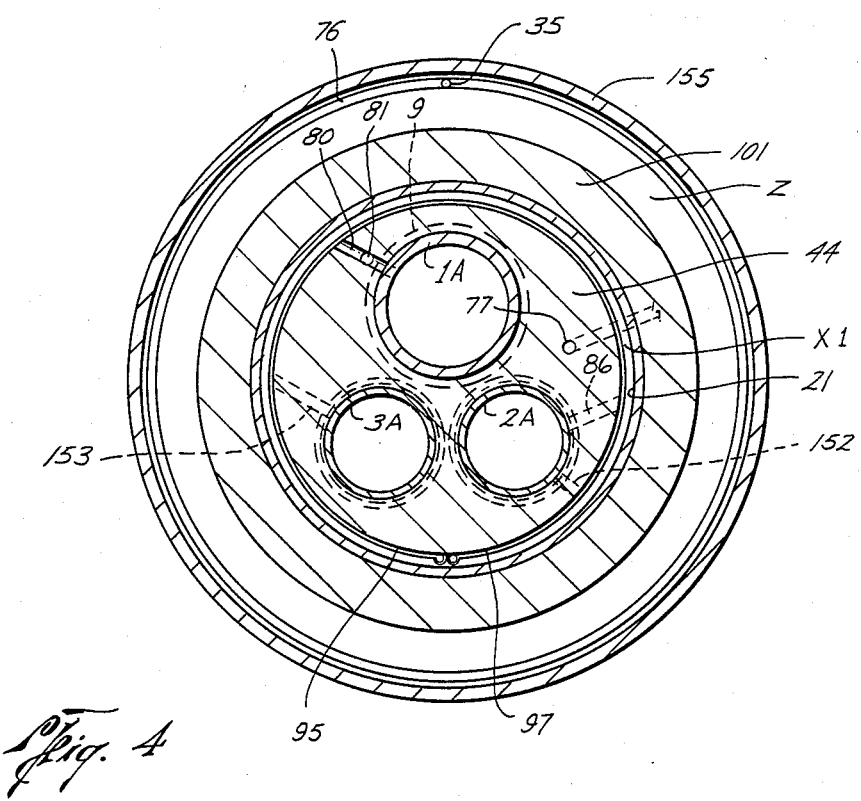
FIG. 4 is a cross-sectional view of the safety joint of the preferred embodiment of the present invention taken along section lines 4—4 of FIG. 1.

As further shown in FIG. 2, cylinder bore 82 located in flange member 44 is shaped and sized to receive spool valve 83 therein. The body of spool valve 83 has a main body portion 83'' and reduced diameter portion 84. Main body portion 83'' of spool valve 83 is fitted with grooves 26A, 27A at each end to receive interchangeable seals 26, 27, respectively. Reduced diameter stem 84 extends from the end of the main body portion 83'' adjacent to seal 27 and through seal 28 provided in retainer plug 85 which is set in the wall at the end of upset diameter portion 73. A passageway 86 is also formed in flange 44 and intersects cylinder bore 82 at 86A end and proceeds to intersect cross ports 87 (FIG. 5) at the other end. Cross port 87 is in fluid communication with mandrel 2A (FIG. 4). A check valve 88 is located in an enlarged portion of passageway 86 and in line with passageway 86 to prevent back flow to cylinder bore 82 from mandrel 3A (FIG. 4). A second passageway 90 is formed in upset diameter portion 73 of flange 44 between pressure chamber Y (FIG. 1) and cylinder bore 82. Passageway 90 has an enlarged section to receive a check valve 89 placed in line with passageway 90 to prevent communication from chamber Y, described infra, from mandrels 1A in the event of leakage at seal 26. Flange member 44 is further provided with sets of circumferential grooves 92, 94 (FIG. 7) located, for the preferred embodiment of three conduits, in two places for each mandrel along a common surface sealed at the end of the surface by seal 15 (FIG. 1).

Because the invention accomodates a multiplicity of conduits (in the preferred embodiment), each conduit, by virtue of its primary seal size and contained pressure, will generate a load which tends to separate the abutting faces of flanges 43, 44. These separation forces are additive and the sum of these forces normally, except for the present invention, are restrained by the tensile strength of fasteners 58. In the present invention, the purpose of the pressure compensated safety joint 200 is to permit the separation of a conduit at a specific location and at a specific externally occasioned physical load. It can be further appreciated that because of the possibility of significant pressure fluctuations within a given conduit or combination of conduits, variations in separation loads would be produced of such magnitude as to make the selection of proper fastener 58 size virtually impossible, if compensation were not available.

In order to offset, or approximately offset, these variable separation loads, a series of pistons, generally equal in quantity and approximately equal in cross sectional area as that of the cross sectional area of each primary seal 1B, are disposed to be attached to a load bearing member or members so selected so as to produce a compensatory load applied to counteract the aforementioned separation loads. Thus a constant stress level is maintained on fasteners 58 approximately equal to those stresses induced in the fasteners 58 at the time of installation of fasteners 58.

Figure 7:
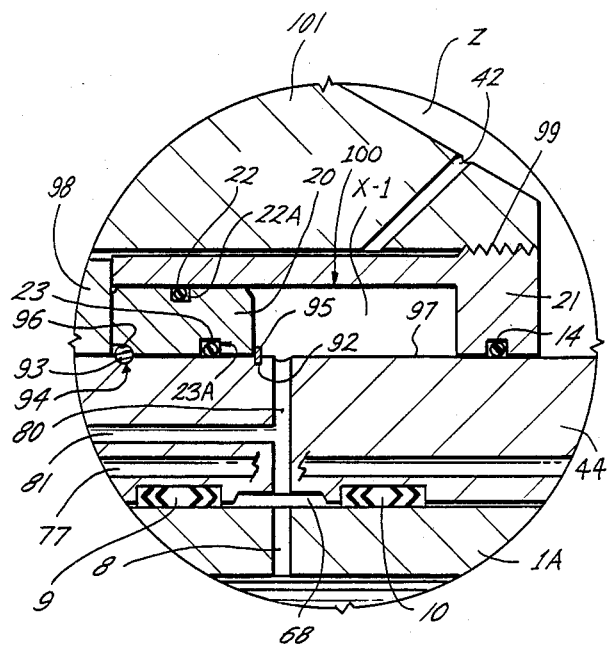
FIG. 7 is a cross-sectional view of a portion of a piston/cylinder of the safety joint of the preferred embodiment of the present invention shown in FIG. 1.

One such cylinder piston arrangement is illustrated in FIG. 7 and may be considered typical of all (three in the preferred embodiment). The piston/cylinder in FIG. 7 is designated X-1 and receives pressure from mandrel 1A through cross ports 80, 81 see also (FIG. 4).

As set out supra, flange member 44 is further provided with radiused groove 94 and rectangular groove 92. A ring 93, round in cross section wound into a noncontinuous diameter approximately equal to outside diameter 97 of flange member 44, is received in groove 94.

An annular piston 20 is slidably installed over the surface of outside diameter 97. Open ended internal groove 96 is formed in piston 20 and serves to trap ring 93 and prevent further leftward (as seen by facing FIG. 7) movement of annular piston 20.

Annular piston 20 is restrained from rightward movement by lock ring 95, a rectangular cross sectioned ring, otherwise similar to ring 93 and located in groove 92.

An annular cylinder 21 is installed over the surface of the slidably installed piston 20 and over the surface of the portions of flange 44 having outside diameter 97. The outside diameter of annular cylinder 21 is threadedly connected to threads 99 of piston housing 101. The leftward (as seen by facing FIG. 7) movement of piston 20 is restricted by previously installed adjacent annular cylinder 98 (FIG. 7).

Rightward (as seen by facing FIG. 7) movement of annular cylinder 21 is prevented by engagement of its upper surface with thread 99 of piston housing 101. Seals 22 and 23 mounted in grooves 22A and 23A of piston 20 prevent passage of fluids over or under annular piston 20. The end of cylinder 21 is sealingly engaged by seal 14 with the surface of the outer diameter portion of upset diameter portion 73.

Pressure equal to pressure in mandrel 1A contained by sealed annular piston 20 and cylinder 21 would generate a leftward (as seen by facing FIG. 7) urging force. Said force would be transmitted to the surface 97 of flange member 44 by surface 96 through ring 93 to groove 94. It can be appreciated that careful control of inside diameter 100 of annular cylinder 21, with respect to outside surface 97 diameter on flange member 44, can create a cross sectional area equal or nearly equal to the cross sectional area of primary seal 1B (FIG. 1).

A rightward urging load generated by piston/cylinder X-1 is imparted through thread 99 into piston housing 101, thence, as shown in FIG. 1, through thread 102 to collet ring 165, thence through collet fingers 103 to collet finger dog 74, and is transmitted into housing 76 through matching surface 104.

Said rightward (as seen by facing FIG. 1) urging force transmitted by housing 76 is transferred to flange 43 through thread 46, which threadingly connects housing 76 and flange 43, where said rightward (as seen by facing FIG. 1) force is resolved with leftward (as seen by facing FIG. 1) force generated by primary seal the cross sectional area X-1.

As additional forces from piston/cylinder systems X-2 and X-3 are applied equally or nearly equally for mandrels 2A, 3A for their respectfully primary seal cross sectional areas, it may be understood how additive forces from the three primary seals are counteracted.

Threaded fasteners 58 are employed to urge mating faces of flanges 43 and 44 into contact, thereby providing the compressive force required to effect sealable contact of primary seal 1B and similar such seals installed in ends of mandrels 2, 3 and 2A, 3A, respectively.

Threaded fasteners 58 are shown provided with a reduced diameter portion 105 reducing the fasteners potential tensile strength. Said reduced diameter portion 105 may be selected at the time of assembly to produce tensile failure, within extremely close limits, at any desired load less than that of fasteners of similar material furnished with a full diameter.

Piston/cylinder housing 101 is a cylindrical, annular member containing a counterbore 158 of sufficient diameter to slidably but not sealably accept piston/cylinder assemblies X-1, X-2 and X-3. Counterbore 158 contains at its rightmost end (as seen by facing FIG. 1) matching thread 99 to threadably receive the threaded portion of cylinder 21. Counterbore 158 has at its leftmost end (as seen by facing FIGS. 1 and 7) a reduced diameter portion containing seal 28 and of sufficient diameter to slidably and sealably fit the outer diameter 97 portion of upset diameter portion 73 of flange member 44.

Piston/cylinder housing 101 has disposed upon (as seen by facing FIG. 1) its leftmost upper exterior diameter portion thread 102 to threadably receive thread (attached) to the lower end of collet ring 165. Adjacent to thread 102 and rightwardly disposed of thread 102

(as seen by facing FIG. 1) is somewhat a greater outside diameter portion having outer surface 159 containing seal 16. Further to the right (as seen by FIG. 1) of the portion having surface 159 is disposed yet a greater outside diameter portion having outer surface 160, containing seal 17. Seals 16 and 17 constitute a cross section area equal to, or nearly equal to, an area of surfaces 162 and 161 which is exposed to hydrostatic pressures from the surrounding environment. Areas 162, 161 are disposed, respectively, on the outer extremities of flange members 43, 44. The areas of surfaces 162, 161 shall be the sum of the cross sectional area bound by seals 15, 30 less the sum of cross sectional areas created by the outside diameters of mandrels 1, 2, 3, and 1A, 2A, 3A.

Piston/cylinder housing 101 has on its rightmost exterior (as seen by facing FIG. 1) a somewhat conical surface containing one or more passageways 42 communicating between general counterbore 158 and chamber Z.

Collet ring 165 is an annular member having threads 102 on its interior diameter and said collet ring 165 is threadably received upon matching exterior threads 102 disposed upon the leftmost end of piston/cylinder housing 101.

Enlarged portion 74, at its leftmost end of collect fingers 103 (as seen by facing FIG. 1), includes an internal diameter slightly greater than diameter 73 on flange member 44 and an outside diameter slightly less than recess diameter 164 provided in housing 76.

The collet is further provided with a quantity of longitudinal slots extending axially rightward (as seen by facing FIG. 1) from enlarged portion 74, terminating at ring 165.

The longitudinal slots should be of sufficient quantity and width to permit enlarged portion 74 to deflect, inwardly reducing the outside diameter of enlarged portion 74 sufficiently to permit said portion 74 to be installed in a relative leftwardly manner (as seen by facing FIG. 1) during tool assembly and subsequently withdrawn in a rightwardly manner (as seen by facing FIG. 1) through bore 75 contained in housing 76.

Housing 76 is generally a tubular member having at its rightmost end (as seen by facing FIG. 1), a short counter-bore of a diameter sufficiently greater than diameter 160 to provide slidable and sealable contact with seal 17. Said housing 76 further has disposed on its rightmost exterior (as seen by facing FIG. 1) seals 31, 32 on either side of port 19, and has extending under said seals 31, 32 a longitudinal passageway 35, permitting transfer of gaseous fluids between otherwise separated chambers Z.

Housing 76 further has disposed in its minimum bore 75 an enlarged internal groove 164 of a diameter slightly greater than the normal expanded diameter of enlarged collet portion 74.

Internal groove 164 has at its rightmost end an internally beveled surface 104, said surface 104 having an angle complimentary to the matching angle disposed on rightmost (as seen facing FIG. 1) exterior of collet enlarged portion 74.

The extreme leftmost end (as seen facing FIG. 1) of housing 76 shall contain an internal matching thread 46 and be threadably received upon the outside diameter of flange member 43. Adjacent inside surface 45 is adapted to sealable receive seal 33.

A leftwardly (as seen as facing FIG. 1) adjacent inside surface 71 is sized to slidably and sealably receive seal 24 disposed upon flange member 44.

The connection 200 is covered by hydrostatic shroud 155. One end of shroud 155 is received in a groove in annular flange 156 and pinned to it by shear pin 157 extending through shroud 155 into flange 156. A seal 34 is provided in flange 155. A similar connection and seal is located at the other end of shroud 155. A bore 18 is formed in shroud 155 substantially juxtaposed to bore 18A. Thus, the following pressure chambers are formed:

PRESSURE CHAMBER X

As best shown in FIG. 7, those areas and surfaces subjected to conduit pressure i.e.: (Typical) mandrel 1A, seals 9 and 10, piston 20, cylinder 21, seals 14, 22 and 23.

PRESSURE CHAMBER Y

Those areas and surfaces subjected to pre-pressurizing pressure (during installation) and contained by seals 16, 24, 26 (FIG. 2), 27, (FIG. 2) and 28 and check valve 29.

PRESSURE CHAMBER Z

Those areas and surfaces containing air or suitable gaseous fluids at or near atmosphere pressure, being contained by seals 14, (FIG. 7) 15, 17, 30, 31, 32, 33, and 34 plus seals 22, (FIG. 7) 23, (FIG. 7) 28 through passageways 42. Fluid communication from left or right or right to left (as seen by facing FIG. 1) is provided by passageway 35.

DESCRIPTION OF ASSEMBLY

Referring to FIGS. 1 and 5, the exterior ends of conduits 1, 2, 3, 1A, 2A, and 3A are prepared to receive apparatus for the attachment to similarly sized pipes. This attachment may be by means of welding, clamping, flanging or screwing or other state of the art methods.

All parts are cleaned and coated with a light, protective, lublicating oil or grease.

Next, all seals, except primary seals 1B, 2B, and 3B are installed in their respective grooves or recesses.

Mandrels 1, 2, 3 are inserted thread first into appropriate thru-bores into the left hand end (as seen facing FIG. 1) of flange member 43. The mandrels shall be pushed sufficiently through flange member 43 so as to expose sufficient threaded portion at the opposite or inner face of flange member 43 allowing retainer sleeve 4 to be screwably attached to conduit 1. Similar retainer sleeves are likewise attached to conduits 2, 3.

Mandrels 1A, 2A, 3A are installed in a similar manner in flange member 44. If two or more mandrels are of the same size, care shall be exercised to insure that mandrel cross ports 8 in mandrel 1A (typical of the three) are placed in the proper thru-bore to insure correct alignment of cross ports with corresponding piston/cylinder assemblies X-1, X-2, X-3.

The collet ring 165 is screwably attached to piston/cylinder housing 101, and this assembly is slidably installed on flange member 44.

Piston/cylinder components for piston/cylinder assembly X-3 are installed in the following order (see FIG. 7 as typical for three):

(a) The round snap ring is pushed over flange member 44 into its groove. Next the annular piston is pushed over member 44 to contact the round snap ring. Next the rectangular snap ring is slidably installed over member 44 and received in its designated groove. Completion of assembly X-3 shall be accomplished by the installation of the annular cylinder.

(b) Succeeding piston/cylinder assemblies X-2, X-1 are installed in like manner. It shall be noted the final piston/cylinder assembly X-1 should be provided with a exteriorly threaded annular cylinder, and this threaded annular cylinder will serve as a threaded retainer for the previously installed assemblies X-3, X-2.

Next, piston/cylinder housing 101 and the collet, shall be pushed to leftmost position (as seen by facing FIGS. 1 and 3) over flange member 44, witnessed by the enlarged portion 74 of the collet being positioned over recessed groove located immediately right of the flange portion of flange member 44.

Suitable banding strap should be bound around the axial mid-point of the thin section of fingers 103 of the collet with force sufficient to cause inward deflection of enlarged collet lugs 74 reducing normal diameter of finger 103 lugs 74 to permit effortless entry into housing 76.

After collet lugs 74 have entered the minor bore of housing 76, said banding material should be removed. Housing 101 is next pushed into housing 76 until abutting faces on housings 76, 101, adjacent to port 19, prevent further leftward movement of collet housing 101 with respect to housing 76.

At this point internal frusto conical surfaces provided in threaded ends of mandrels 1, 2, 3, 1A, 2A and 3A should be visibly inspected for contaminants and/or physical damage. Any accumulation of contaminants should be completely removed with clean rags and suitable solvents. Damage, such as scratches, nicks and the like should be removed by light sanding with a fine (crocus type) abrasive material. Damage too severe to be repaired in this manner will require replacement of damaged mandrels.

After being satisfied with acceptable finish on the interal frusto conical surfaces, corresponding primary seals 1B, 2B, 3B should be similarly inspected, prepared, repaired and/or replaced as required in keeping with the aforementioned procedure conducted in mandrels 1, 2 and 3.

Next, inspected primary seals 1B, 2B and 3B should be inserted into their corresponding internal frusto conical matching surfaces. A coating of clean, viscous grease may be applied to the matching surfaces to aid in the retention of the primary seals in said receiving internal surfaces during subsequent assembly.

Flange member 43 containing mandrels 1, 2 and 3 should be screwably installed into left hand, threaded end of housing 76. Rotational force should be applied to the exterior of housing 76 as flange members are fixed in their rotational relationship by intersecting primary seals 1B, 2B, 3B.

Next the required number of pre-sized shear bolts 58 are screwably installed and tightened with sufficient torque in accordance with requirements specified by the manufacturers of the primary seals.

Note: It may be required that flange element 44 be pushed further leftward (as seen by facing FIG. 1) into housing 76 to provide the flange proximately necessary to initiate thread contact for shear bolts 58.

Assembly is completed as hydrostatic shroud 155 is placed over the assembly 200 and sealed on its open-right most end by the installation of flange 156 and retained by inserting shear pins 157.

DESCRIPTION OF OPERATION

Refer to FIGS. 1, 5.
Installation

If the multiple tubular safety joint will be subjected to the possibility of unexpected physical loading during installation, the pre-pressurizing lock-out feature may be activated.

This is done by applying hydraulic pressure at port 79. This pressure will pass through check valve 29, thence through passageway 77, and finally into pressure chamber Y. Pressure chamber Y is contained by flange member 44, housing 76 and piston/cylinder housing 101 and further contained by seals 16, 24, 26 (FIG. 2), 27 (FIG. 2), and 28.

The magnitude of pressure induced in chamber Y may be controlled so as to produce a predetermined load temporarily creating a compressive force across the abutting faces of flange members 43, 44, thereby protecting premature disengagement of the safety joint should it be subjected to unexpected physical loads.

After the system installation has been completed, the operator may release the pre-pressurized lock-out feature by applying line or test pressure to the flow line connected to mandrels 1 or 1A. Said pressure will enter port 8 into port 80 and pressure piston/cylinder chamber X-1. Simultaneously, pressure will enter and be transmitted via passageway 81 to spool valve bore 82 causing spool valve 83 to shift in an upward right hand (as seen by facing FIG. 1) direction striking inner face of retainer 85. Said shifting movement will cause seal 27 to be drawn upward permitting permanent communication between ports 90, 86. See generally FIGS. 1, 2 and 5.

Pre-pressured fluids trapped in chamber Y may now proceed through check valve 89, communicate across spool valve 83 between shifted seals 26 and 27, continue past check valve 88, flow into passageway 86, intersect cross port 87, exhausting finally into mandrel 2A. Mandrel 2A would have been purposely rendered un-pressured and vented in preparation to receive vented pressurized fluids previously trapped in chamber Y.

The two remaining flow lines connected respectively to mandrels 2, 2A and 3, 3A may be next pressure tested and placed in service at the convenience of the operator.

Routine Safety Joint Operation

The multiple conduit safety joint described here contains three conduits. The invention is designed to accomodate two or more conduits in a common housing, and the use of three here is for purposes of illustration and not intended to limit the actual number of conduits which might be employed and which may, but not necessarily, be of the same size, weight or pressure capacity.

The use of three flow lines here is representative of an oil or gas well which has been completed in two different production zones, one line for each of two production tubing strings and the third providing a return line for the use of through-flow-line (T.F.L.) services equipment and/or as a reserve flow line for emergency purposes.

Each connecting set of mandrels contain a common seal; e.g. mandrels 1 and 1A are sealed by common primary seals 1B and so on. Although a frusto conical seal system has been illustrated, it is not intended here to preclude the use of other suitable seals; e.g., ring joint gaskets, BX rings, O-rings and the like.

Each primary seal employed when pressured by line pressure will exert a force tending to separate abutting flange faces of flanges 43, 44. This force shall be considered equal or nearly equal to a load product of seal cross sectional area times the pressure contained therein. Said loads will vary directly proportionately to the variation of the contained pressures.

The other two conduits, in like manner, will exert additional loads equal or nearly equal to their seal size and individually contained pressures.

The three conduit forces are additive and the sum of their forces will act as a single load tending to separate abutting flange faces of flanges 43, 44.

Each common set of conduits is connected by a series of parts and seals to a piston/cylinder arrangement, so sized as to offer a piston of equal or nearly equal cross sectional area as that of its corresponding primary seal.

The assembly of piston/cylinder assemblies X1, X2, X3 are attached to interrelating flange member 44 and piston/cylinder housing 101. Piston/cylinder housing 101 being mechanically linked through collet 103 and integral lugs 74 transmits cumulative loads created by piston/cylinder assemblies X1, X2, X3 into housing 76 finally through matching threads into flange member 43.

It may be understood that the cumulative loads generated by primary seals 1B, 2B, and 3B are hydraulically counteracted or offset by matching cumulative loads generated by piston/cylinder assemblies X1, X2, X3.

This arrangement creates a static load condition across flange members 43, 44 and thus bolting system 58 may be designed to accurately withstand a predetermined physical load.

It may be further appreciated that loads caused by pressure variations experienced in each separate conduit are immediately compensated in direct proportion by the combined piston/cylinder assemblies in fluid communication with such conduit.

Accordingly, in the course of normal, intended operation, this device may be expected to compensate internally for varying pressure conditions.

In order to compensate for external pressures occasioned by hydrostatic head, a hydrostatic shroud is provided consisting of shroud cannister 155, annular flange 156, shear pins 157 and seals 30, 31, 32, 34, 7, 15, 16, and 17.

Hydrostatic pressures entering through port 19 and thence through port 19A, (FIG. 5) finally enters a chamber sealed by seals 16, 17. Said chamber is designed to create a piston/cylinder equal, or nearly equal, in area to that of the exposed exterior ends of flange members 43, 44 less the combined closed cross sectional areas of mandrels 1, 2, 3, 1A, 2A, 3A.

Therefore hydrostatic pressures creating loads, impinging in a compressive manner upon the abutting faces of flange members 43, 44, are offset by an opposing force created by the same hydrostatic pressures entering ports 19 and 19A and bearing against the piston/cylinder contained by seals 16, 17.

Disengagement

Should, during the course of normal operation, those flow lines connected to mandrels 1, 2, 3, 1A, 2A, 3A be subjected to physical loads, previously deemed excessive and damaging to adjacently attached equipment, the pressure compensated multiple tubular safety joint will disengage automatically as follows:

(a) Loads transmitted through said conduits imparted to flange members 43, 44 through retainer collars 4, 4A (typical of all three) are brought to bear in shear bolts 58 and finally result in a tensile failure across reduced section 105. Upon said failure, flange faces on members 43, 44 will separate, allowing flange member 44 to move relatively rightward with respect to housing 76, moving recessed groove 72 under enlarged portion 74 of the collet.

Figure 8:
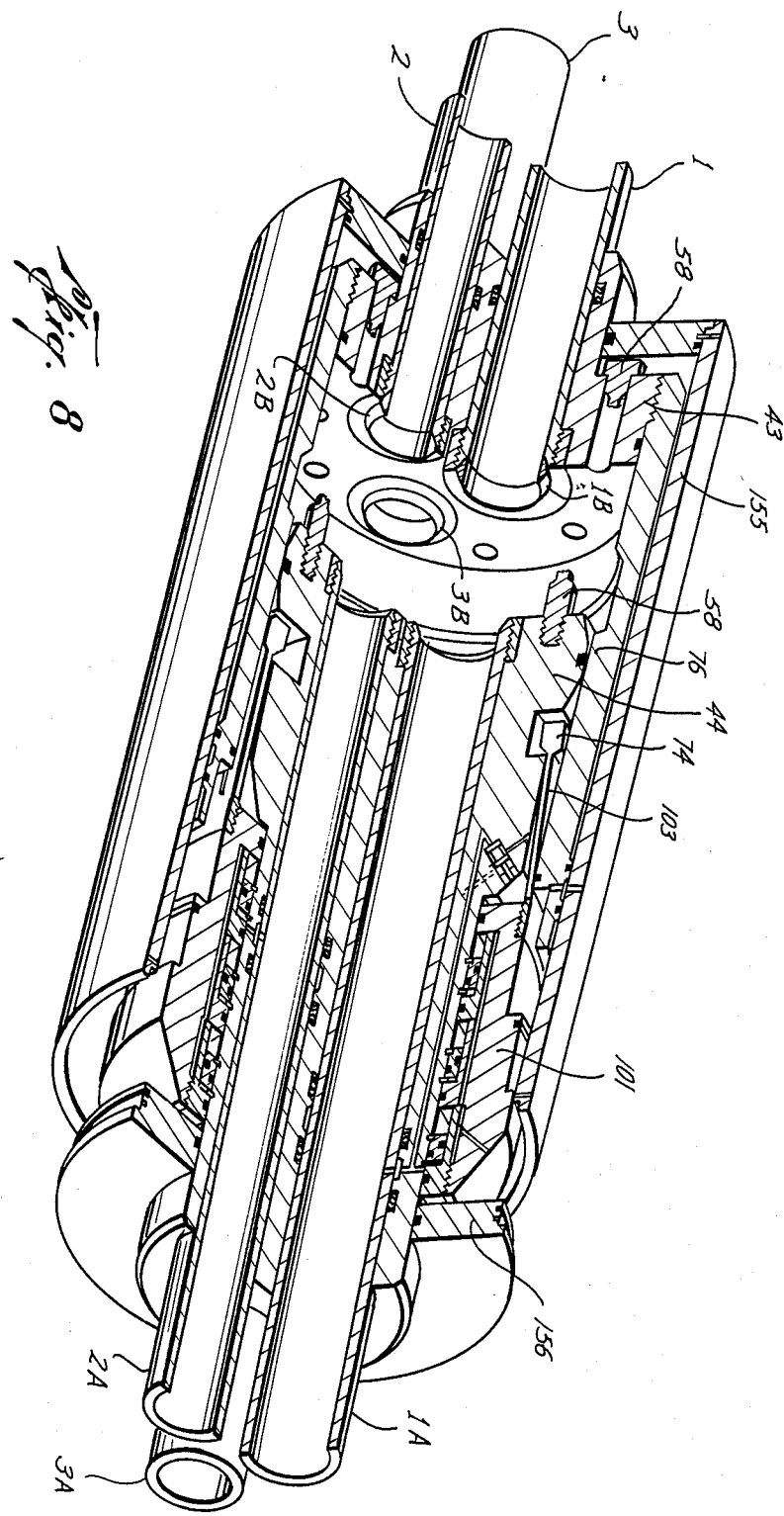
FIG. 8 is a view, partially in cross-section and partially in perspective of the safety joint of the preferred embodiment of the present invention after the bolts have been sheared.

(b) Portion 74 of the collet will then no longer be held in position by surface 73 and is permitted to deflect inwardly into the recessed groove formed by portion 72, thereby reducing the original outside diameter of lugs 74 sufficiently to permit rightward movement (as seen by facing FIG. 8) of flange member 44, carrying with it piston/cylinder housing 101 and attached collet 103. (FIG. 8).

The aforementioned rightwardly moving parts will next strike annular flange 156, shear shear pins 157, allowing further rightward movement, completing disengagement of the pressure compensated multiple conduit safety joint.

Although the system described in detail above is most satisfactory and preferred, many variations in structure and method are possible, such as changes in the materials of construction or dimensions or the type of connector.

Figure 9:
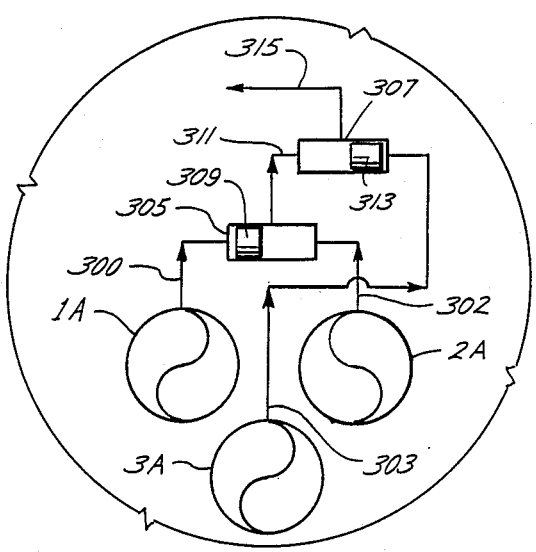
FIG. 9 is a schematic view of the safety joint of an alternate embodiment of the piston system of the present invention.

For example, as seen in FIG. 9, as an alternative embodiment, mandrels 1A, 2A, 3A may communicate by bores 300, 302, 303, respectively, to two shuttle cylinder/pistons 305, 307. As shown in FIG. 9, bores 300, 302 are in fluid communication to opposite sides of sealed piston 309. A bore 311 communicates from the cylinder of cylinder/piston 305 to one side of sealed piston 313. The other side of sealed piston 313 is in fluid communication with bore 303. A bore 315 provides fluid communication between cylinder piston 307 and a single pressure chamber X.

Pressure chamber X might be equipped to have a surface area approximately equal to the sum of the surface areas of the three seals. The fluid pressure entering bore 315 would be the highest pressure of the three mandrels 1A, 2A, 3A.

Because many varying and different embodiments may be made within the scope of the inventive concept herein taught, and because modifications may be made in accordance with the descriptive requirements of the law, it should be understood that the details herein are to be interpreted as illustrative and not in a limiting sense.

What is claimed is:

1. A coupling for releasably joining together in sealed relationship a first, second, third and fourth segments of a tubular system having a flowing fluid under pressure flowing therethrough and having force applied thereto, comprising:

a first tubular member connected to the first segment;

a second tubular member connected to the second segment;

a third tubular member connected to the third segment, said third member juxtaposed to said first member;

a fourth tubular member connected to the fourth segment, said fourth tubular member juxtaposed to said second member;

seal means for sealing the juxtaposition of said tubular members;

holding means for holding said first tubular member and said third tubular member in abutment and for holding said second tubular member and said fourth tubular member in abutment;

said holding means including weak link means for decoupling said first member from said third member and said second member from said fourth member upon the application of a pre-determined axial force on one of the members through one of the segments below the elastic limit of any of the segments;

said holding means includes compensating means for compensating said weak link means for deviations of the force from axial hydraulic load acting on said seal means, wherein there is further included lock-out means for pre-loading compressive force on said holding means for maintaining said tubular members in sealing juxtaposition.

2. The coupling of claim 1, wherein there is further included release means for remotely releasing said compressive force pre-load through two sets of said tubular members.

3. The coupling of claim 2, wherein said release means includes a portion of said compensating means for substantially balancing force applied to the holding means from the pressure of the flowing fluid, said compensating means being activated upon release of said compressive force.

4. The coupling of claim 3, wherein:

said lock-out means includes force fluid for applying said compressive force, the pressure of said force fluid being less than the pressure of the flowing fluid; and said release means includes a valve for providing fluid communication between said force fluid and the flowing fluid and between said force fluid and one of the members acting as a vent.

5. A coupling for releasably joining together in sealed relationship a plurality of segments of a tubular system, comprising:

a first tubular member connected to the first set of segments;

a second tubular member connected to a second set of segments, said second member juxtaposed to said first member such that individual segments of the first set are in fluid communication with individual members of the second set;

first seal means for sealing the juxtaposition of said tubular members;

holding means for holding said first tubular member and said second tubular member in juxtaposition;

lock-out means for hydraulically pre-loading compressive force on said holding means for maintaining said tubular members in sealing juxtaposition;

said holding means including weak link means for decoupling said first member from said second member upon the application of a pre-determined axial force on one of said members through at least one of said segments below the elastic limit of any of the segments.

6. The coupling of claim 5, wherein there is further included release means for remotely releasing said hydraulically pre-loading compressive force on said holding means through pressure of fluid in one of the segments.

7. The coupling of claim 6, wherein there is further included vent means for venting the hydraulic pre-load fluid to another of the segments.

8. A coupling for releasably joining together in sealed relationship a plurality of segments of a tubular system, comprising:

a first tubular member connected to the first set of segments;

a second tubular member connected to a second set of segments, said second member abutting said first member such that individual segments of the first set are in fluid communication with individual members or the second set;

first seal means for sealing the abutment of said tubular members;

holding means for holding said first tubular member and said second tubular member in abutment;

said holding means including weak link means for decoupling said first member from said second member upon the application of a pre-determined axial force on one of said members through one or more of said segments below the elastic limit of either of the first or second segments; and compensating means for substantially offsetting force applied to the holding means from the pressure of fluid in the segments, wherein there is further included lock-out means for releasably hydraulically preloading compressive force on said holding means for maintaining said tubular members in sealing juxtaposition.

9. Joint apparatus for placing on the bottom of a body of water a made-up coupling having a weak link attached to multiple sets of tubular segments in which fluid will flow, comprising:

pre-stressing means for pre-stressing the coupling to relieve tensile stress on the weak link;

means for lowering the coupling onto the bottom;

relieving means for relieving said pre-stressing by causing the flowing fluid to flow through one of the segments and the coupling.

10. The apparatus of claim 9, wherein:

said pre-stressing means includes means for causing compression fluid at a first pressure to flow from the exterior of the coupling to the interior of the coupling to act on the coupling to relieve tensile stress.

11. The apparatus of claim 10, wherein:

said relieving means includes means for causing the pressure of the flowing fluid to be greater than the pressure of the compression fluid.

12. A coupling for releasably joining together in sealed relationship a first, second, third and fourth segments of a tubular system having a flowing fluid under pressure flowing therethrough and having force applied thereto, comprising:

a first tubular member connected to the first segment;

a second tubular member connected to the second segment;

a third tubular member connected to the third segment, said third member juxtaposed to said first member;

a fourth tubular member connected to the fourth segment, said fourth tubular member juxtaposed to said second member;

seal means for sealing the juxtaposition of said tubular members;

holding means for holding said first tubular member and said third tubular member in juxtaposition and for holding said second tubular member and said fourth tubular member in juxtaposition;

said holding means including weak link means for decoupling said first member from said third member and said second member from said fourth member upon the application of a pre-determined axial force on one of the members through one of the segments below the elastic limit of any of the segments; and said holding means includes compensation means for compensating said weak link means for deviations of the force from axial hydraulic load acting on said seal means, wherein said compensating means includes a piston/cylinder compensator per set of said juxtaposed tubular members, said compensator being connected to one of said members, and wherein said compensators are connected in series to cumulate pressure changes in said members.

13. A coupling for releasably joining together in sealed relationship a first, second, third and fourth segments of a tubular system having a flowing fluid under pressure flowing therethrough and having force applied thereto, comprising:

a first tubular member connected to the first segment;

a second tubular member connected to the second segment;

a third tubular member connected to the third segment, said third member juxtaposed to said first member;

a fourth tubular member connected to the fourth segment, said fourth tubular member juxtaposed to said second member;

seal means for sealing the juxtaposition of said tubular members;

holding means having a first flange assembly mounted on said first and third tubular members for holding said first tubular member and said third tubular member in juxtaposition, and having a second flange assembly mounted on said second and fourth tubular members for holding said second tubular member and said fourth tubular member in juxtaposition;

said holding means including a housing sealingly connected to said first flange assembly and said second flange assembly, and for sealingly surrounding said juxtaposition of said tubular members;

said holding means including weak link means for decoupling said first member from said third member and said second member from said fourth member upon the application of a pre-determined axial force on one of the members through one of the segments below the elastic limit of any of the segments;

said holding means includes compensating means for compensating said weak link means for deviations of the force from axial hydraulic load acting on said seal means; and said holding means includes pressure compensation means for counterbalancing environmental pressure forces on said housing.

14. A coupling for releasably joining together in sealed relationship a first, second, third and fourth segments of a tubular system having a flowing fluid under pressure flowing therethrough and having force applied thereto, comprising:

a first tubular member connected to the first segment;

a second tubular member connected to the second segment;

a third tubular member connected to the third segment, said third member juxtaposed to said first member;

a fourth tubular member connected to the fourth segment, said fourth tubular member juxtaposed to said second member;

seal means for sealing the juxtaposition of said tubular members;

holding means having a first flange mounted on said first and third tubular members for holding said first tubular member and said third tubular member in juxtaposition, and having a second flange mounted on said second and fourth tubular members for holding said second tubular member and said fourth tubular member in juxtaposition, wherein said holding means includes a housing and said second flange has an upper end adjacent to said housing, said upper end surface of said second flange being substantially a segment of a sphere;

said holding means including a first set of bores in said first flange and a correlative second set of bores in said second flange;

said holding means including bolt means extending through said first and said second set of bores for connecting said first flange and said second flange;

said holding means including weak link means for decoupling said first member from said third member and said second member from said fourth member upon the application of a pre-determined axial force on one of the members through one of the segments below the elastic limit of any of the segments; and said holding means includes compensating means for compensating said weak link means for deviations of the force from axial hydraulic load acting on said seal means.

* * * * *